United States Patent [19]

Gaubis

[11] 4,098,062

[45] Jul. 4, 1978

[54] HAND OPERATED FRUIT PICKER, WITH HOLDER

[76] Inventor: Alfred E. Gaubis, P.O. Box #597, Fruitland Park, Fla. 32731

[21] Appl. No.: 743,502

[22] Filed: Nov. 19, 1976

[51] Int. Cl.² .......................................... A01D 46/24
[52] U.S. Cl. ................................................ 56/334
[58] Field of Search ......................... 56/332, 333, 334

[56] References Cited

U.S. PATENT DOCUMENTS

| 36,334 | 9/1862 | Brinkerhoff et al. | 56/334 |
|---|---|---|---|
| 309,362 | 12/1884 | Saunders | 56/334 |
| 339,549 | 4/1886 | Hill | 56/334 |
| 359,777 | 3/1887 | Eaton | 56/333 |
| 635,990 | 10/1899 | Wood | 56/333 |
| 743,754 | 11/1903 | Rohr | 56/334 |
| 1,013,144 | 1/1912 | Fellows | 56/333 |
| 1,039,640 | 9/1912 | Bookwalter | 56/334 |

*Primary Examiner*—Russell R. Kinsey

[57] ABSTRACT

The applicant's hand operated fruit picker and bag is characterized by a cage which has a narrower mid-section, horizontal zone or area, the upper section of which cage is concave in shape, forming a pocket, a pole to which the cage is attached at the pole's upper extremity, a horizontally pivoted gate facing the cage, which gate is held in normal closed position by springs attached to it and within the cage, the said gate having an upper section and a lower section, the angle between the two sections being about 137°, the gate being of a size to fit within the cage when completely closed, the upper section of the gate not extending to the top of the cage when in closed position, thus leaving a space, whereby when the unit of fruit that is being picked is within the aforesaid pocket, it is readily detached upon a pull upon the pole by the operator of the picker, a control cable attached to the gate at its own upper end, and at its lower end pivoted to the pole, whereby the operator can act against the force of the springs, thus to open the gate and admit the fruit unit to be picked to the cage.

3 Claims, 4 Drawing Figures

HAND OPERATED FRUIT PICKER, WITH HOLDER

The Object of the Invention, With Some Reference To Prior Art

This invention relates to a hand operated fruit picker with a bag or the equivalent to receive the fruit, that consists of a pole to which there is supported at the pole's upper extremity a cage positioned a distance from the pole horizontally, a gate having a horizontal upper and lower section forming an angle between the sections of approximately 137°, the said gate normally held in closed position by springs, which are respectfully attached to the upper part of the lower section of the gate and at their other end within the cage as a base, the gate being of lesser size than the cage, whereby it fits therein when the fruit picker is in closed position. When the gate is brought from an open position to the closed position with a unit of fruit within the cage by the tension of the springs, the said fruit can be detached by a pull upon the pole. A control cable is attached at its upper end to the gate and at its lower end to a lever pivotally attached to the pole, whereby the gate may be brought to open position by a pull of sufficient force on the lever to overcome the tension of the springs attached to the gate.

A more particular object of this invention is to provide a hand operated fruit picker with a bag attached, which is characterized by a pole to which there is supported at the pole's upper end a cage positioned a short distance horizontally from the pole, a gate having a horizontal upper and lower section, forming an angle between them of 132°–142°, said gate normally held in closed position by springs, which are respectively attached to the upper portion of the lower section of the gate, and at their lower end within the cage as a base, the gate being of a lesser size than the opening of the cage, so that the gate may fit within it in closed position, the lower section of the gate having a height that is approximately equal to the distance between the horizontal pivot for the gate and the front of the cage at its middle, a control cable attached to the gate at the cable's upper end and at its lower end to a lever that is pivoted to the pole, whereby the gate can be brought to an open position by a pull of sufficient magnitude to overcome the tension of the said springs, thus to admit fruit to the cage. Upon the release of the pull upon the lever the unit of fruit is caught in the cage, whereby by a slight downward pull upon the pole the unit of fruit is readily detached from the branch.

It is a further object of the invention to provide a hand operated fruit picker, as set forth in the paragraph above, whose cage has a constricted, horizontal zone and whose section above the narrower area has a concave surface, which said surface forms a pocket for holding the unit of fruit that is to be picked by a downward pull by the operator of the pole.

There have been previously invented and patented hand operated fruit pickers, some with a bag and some without it, each of which pickers has a cage and a gate, which gate is controlled by a cable that a person, known as the picker (individual) operates to detach the fruit.

One such device in this category is the E. D. Eaton U.S. Pat. No. 359,777. Essentially it has a pocket with an opening on one side of the cage. In the top of the pocket there is a narrow slot. In this fruit picker, unlike in the applicant's fruit picker, the gate is closed by a cord or rod and a crank, and is opened by a retracting spring. The crank arm extends along the outside of the pocket.

In the C. F. Fellows U.S. Pat. No. 1,013,144 the movable jaw is pivotally attached down the pole in reference to the fixed jaw. In closed position the entire movable jaw is rather vertical in position.

In the J. C. Ward U.S. Pat. No. 635,990, the movable jaw is held open by a spring. The pivot for the movable jaw construction is well below the top of the pole.

Having stated some objects of the present invention, also stated wherein the present invention has inherent advantages not associated with several other described inventions that are upon hand operated fruit pickers, the features of the present invention will be set forth now.

The Description of the Invention Via An Embodiment

The features of my invention are pointed out below in detail, reference being had to the accompanying drawing, in which several views are offered; similar reference characters indicate corresponding parts throughout the several views.

Figure 1:
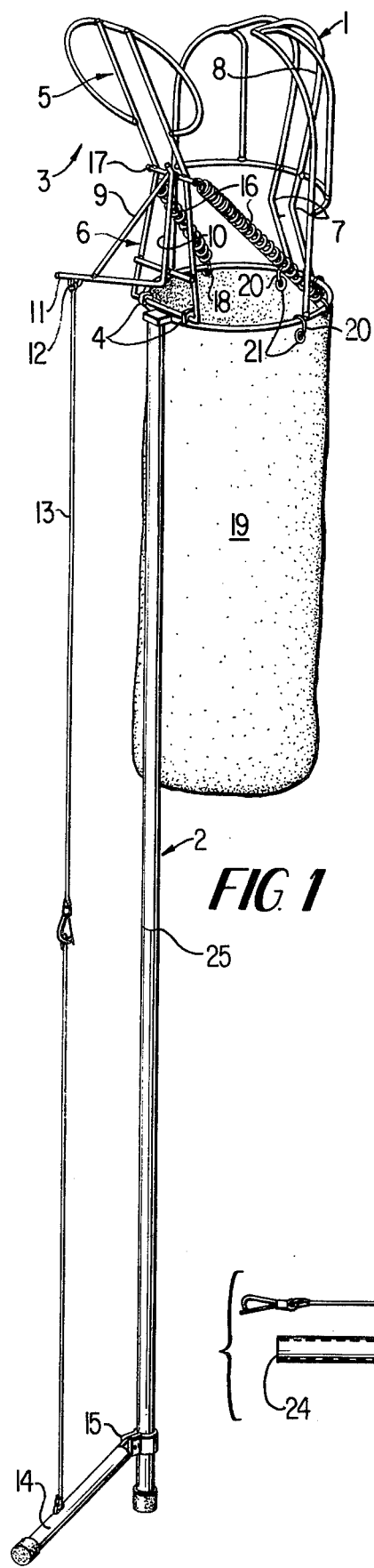
FIG. 1 is a perspective view of the invention.

In order to more clearly perceive the construction, the fruit picking device is shown made of wire. This is merely a choice and not a limitation of it.

The cage 1 is fastened rigidly to pole 2 at the latter's upper extremity. Gate 3 is hinged upon the bottom ring of the cage to swing upon a horizontal pivot, indicated by numeral 4, just above the apex of the pole, as seen from FIG. 1 as well as FIGS. 2 and 3. The cage should be of proper size and shape to accomodate fruit of 2–5 inches in diameter. The gate is formed of two integral sections, numbered 5 and 6 respectively, as clearly revealed in FIG. 1. The cage 1 has a narrower horizontal area or zone, approximately mid-way of its height, this being indicated by numeral 7, clearly shown in FIGS. 1 and 2, as well as FIG. 3. It will be seen that the upper section of the cage, i.e. above narrower cross-section 7 has a concave configuration, indicated by numeral 8. This concave configuration is important for firmly holding the fruit when the gate is in closed position, and for ease of detachment of the fruit unit from the tree's branch. As mentioned previously the gate has two sections, and these form an angle of substantially 132°–142° with one another, as shown in drawing; see FIGS. 2 and 3. The junction of sections 5 and 6 can be curved somewhat; but the angle made by the two sections would remain the same. The height of the lower section of the gate is such that its upper terminal extremity is at about the location of the above mentioned narrow area in the cage when the gate is in closed position, as seen from FIG. 3 of the drawing. The upper section of the gate, when the gate is in this position, holds the fruit firmly within the concave section of the cage; see FIG. 3, the fruit along with a leaf being outlined. The angle between the two sections of the gate is not absolutely invariable for effective operation of the gate with the cage to detach the unit of fruit; however this angle shown in this drawing is quite effective in the operation of the fruit picker and to detach the fruit upon a slight downward pull upon the pole by a person.

Figure 2:
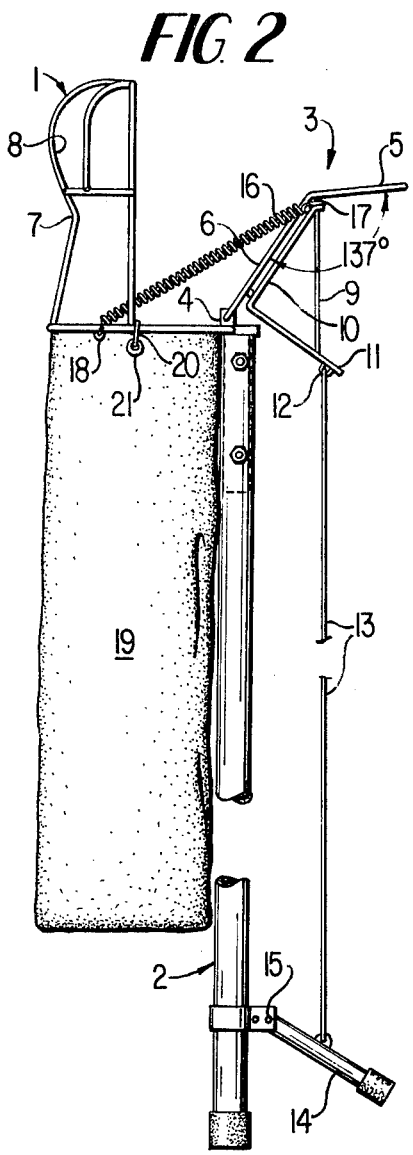
FIG. 2 is a side elevation of the picker in open position.
Figure 3:
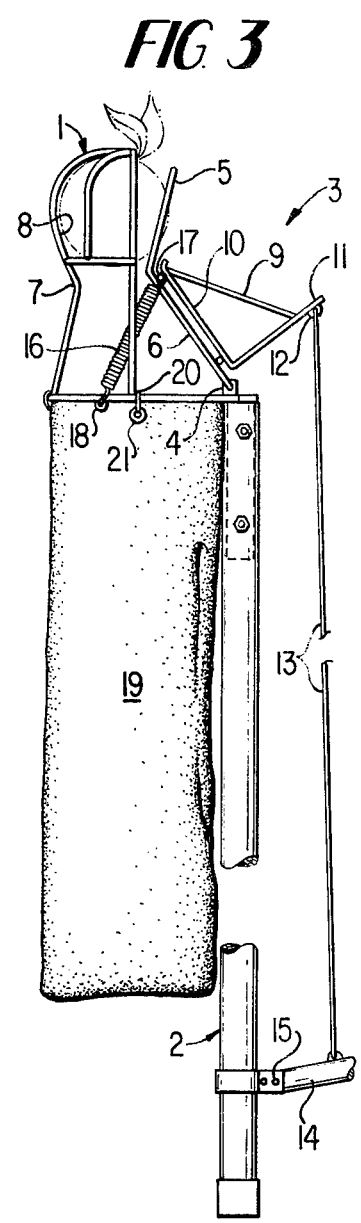
FIG. 3 is a side elevation, the same as FIG. 2 only the gate is in closed position with fruit in the cage shown in broken line.

The structure of the gate not described above consists of a triangular shaped member 9, clearly shown in FIGS. 2 and 3, the two legs of which are approximately the same length, with a longer connecting side. One of the legs 10 is attached firmly to the outer section 6 of the gate. To the lower end of the leg indicated by numeral 11 is attached an eye 12, to which control cord 13 is attached at the cord's upper end. The lower end of this control cord is fastened to the lever 14, which is in turn is pivotally attached at 15 to a collar surrounding the pole, as seen in FIGS. 2 and 3.

Referring back to cage 1 and gate 3, the gate is held or maintained in closed position normally by the force of two springs 16; these springs are attached to upper cross member 17 of gate 3; the lower end of springs 16 is attached to eyelet 18 on the bottom ring of the cage. The bag 19 is attached with wires 20 around the bottom ring of cage and through grommets 21 in top of the bag.

Figure 4:
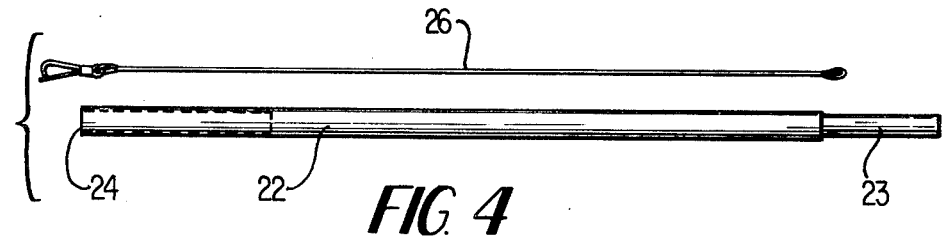
FIG. 4 is a view of extension member for the pole, and control cable extension.

The pole or handle is or may be made of 4 feet sections in order to vary the length thereof. The length, obviously, will depend upon the distance from the ground the fruit being gathered is. The poles are equipped with locking device of a friction type. This is shown in FIG. 4, where the section numbered 22 has an end portion 23 of lesser diameter, which would frictionally fit into the restricted portion shown at 24 but, of course, of another section that would comprise the adjusted pole's extension in length. FIG. 1 shows at point numbered 25 the friction union of two sections that comprise this pole 2. Both from FIGS. 1 and FIG. 4, it will be seen that there are sections which comprise the control cord 13; from FIG. 4, it will be seen that such section has a clamp at one end, and an eye at the other end. Obviously if two 4 feet sections, and/or two sections of control cord are not sufficient in length, other units will have to be added. The means just described would permit quick assembly and also quick dissembly of the pole and the control cord, hence the complete fruit picker, whereby the fruit, whatever its height from the ground, may be rapidly picked by an individual. The position of the lever, indicated in FIG. 1, 2 and 3 by numeral 14, may be adjusted by the loosening and the subsequent tightening, as by a wing nut. The pole can be constructed of aluminum or a combination of aluminum and wood, or of thin metal tubing of other composition, including plastic, or combination. Thus also the lever. The control cable may be made of steel, or nylon, or other composition.

The cage and the gate of this fruit picker can be constructed of aluminum, or of sheet metal, or of plastic or of heavy wire; the last has been disclosed herein. The choice is not of the essence of this invention; but for practical purposes the material should not be too heavy so as to be burdensome to the operator, obviously. Rubber strips or soft plastic can be applied or affixed to the area of the interior of the surface of the cage and the gate that would come into contact with the fruit. The use of such linings would be needed only for soft skin fruit or fragile fruit, such as avacado and pear.

Having described the structure of this fruit picker, its operation will now be set forth, making reference for a clearer understanding to the several views of the device in the drawing, when expedient. The operator holds the pole so that the cage 1 with the gate 2, in open position, is in back of the unit of fruit to be picked. The fruit picker, which normally has its gate in closed position, due to the springs attached to the gate, has previously been brought to its open position by the operator by pulling down on the lever 14, thus overcoming the tension of the springs 16. Then by allowing the gate to close by slackening the pressure that had previously been put on the lever, the fruit is guided into the cage and held firmly in place against the concave section or area 8 of the cage. With the fruit in this position the operator is enabled to pull the unit of fruit from the branch of the tree with a minimum of effort. This lesser expenditure of effort is one thing that conveys an advantage in the use of this fruit picker compared to others known to the applicant that are on the market. Having now detached the fruit, the gate is then opened slightly, by increasing the pull on the lever, which permits the fruit to drop into the bag. The above steps may be thereupon repeated, without lowering the picker, upon the other units of fruit in that approximate height.

Reference in the description of the fruit picker above has been made of the sections, such as of 4 feet, which can be inserted to enable fruit at higher elevations to be readily picked. How these are put into the pole will now be also described. This achieves an extension of the pole when desirable. Disconnect the control cable in the center by operating the spring clip. Twist the pole with lever attached to the left, and pull apart. Then insert a 4 foot plain extension section, twist to the right to lock in. Connect extension control cable with a spring snap, or clip. Connect control cable of the lever to this, which also has a spring snap. If necessary, turn lever so that it is in upward position.

It is for best operation of my fruit picker to have the control cable approximately 4 inches away from the pole, thus causing no obstruction whatsoever to the operator of the fruit picker. That is not a limitation but such distance is preferable to assist the operator of the picker.

While I have shown and described a preferred embodiment of this invention, I am aware that structural changes may be made without departing from the spirit of the invention of the applicant.

And I, therefore, claim as my own improvements as fairly within the scope of the appended claims:

1. A hand operable fruit picker, characterized by a pole, and a gate which gate is horizontally pivoted to the upper end of the said pole, and a cage fixedly attached to the pole and which cage has an opening therein and also has a horizontally restricted area therein forming an upper chamber amply large to hold fruit unit, the said upper chamber having a concave shaped section to accomodate the unit of fruit, the said gate facing the opening of the cage, the gate being formed of two horizontal sections, the angle between these two sections being substantially 132°-142°, the lower section having a height of approximately the distance between the pivot of the gate and the restricted area of the cage, the gate being of lesser size than the opening of the cage, so that it can fit within the cage's opening when in closed position leaving a space above the gate, springs attached at their lower end within the cage and at their upper end to the gate at the upper end of the lower section of the gate, a control cable and a lever, which cable is attached to the gate at its own upper end and to the lever at its lower end, the said lever being pivotally attached to the pole.

2. A fruit picker as set out in claim 1, wherein the gate has a triangular shaped member attached to the gate on the wide not facing the cage's opening via one leg of the triangle, and the control cable attached to another of the two other legs of the triangle.

3. In a hand operable fruit picker, the combination of a cage having an opening therein and a gate which gate forces the cage's opening, the said cage having a horizontally restricted area to form a chamber in the upper part thereof of a size to hold a piece of fruit, the said upper part having a concave shaped section to hold the said piece of fruit, the gate being of lesser size than the opening and of a height sufficiently less than the inner height of the cage to leave a significant space above its own upper extremity for a branch of the fruit tree to exist, the gate having two sections forming an angle between the sections of substantially 132°–142°, the gate being horizontally pivoted, the height of the lower section thereof being approximately the same as the distance between the gate's pivot and the restricted area of the cage.

* * * * *